US007773253B2

(12) United States Patent
Katayanagi

(10) Patent No.: US 7,773,253 B2
(45) Date of Patent: Aug. 10, 2010

(54) GLOSS DIFFERENCE CONTROL IN A PLURALITY OF NETWORKED IMAGE FORMING APPARATUS

(75) Inventor: Hidetoshi Katayanagi, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 966 days.

(21) Appl. No.: 11/147,215

(22) Filed: Jun. 8, 2005

(65) Prior Publication Data

US 2006/0028671 A1 Feb. 9, 2006

(30) Foreign Application Priority Data

Aug. 5, 2004 (JP) ............................ 2004-229139

(51) Int. Cl.
*H04N 1/29* (2006.01)
*H04N 1/32* (2006.01)
*H04N 1/40* (2006.01)
*G06K 15/14* (2006.01)
*G03G 15/20* (2006.01)

(52) U.S. Cl. ...................... 358/1.9; 358/3.27; 358/1.15; 358/406; 358/468; 358/300; 399/8; 399/15; 399/67; 399/69; 399/81; 399/328

(58) Field of Classification Search ................ 358/3.06, 358/520, 1.9, 3.27, 1.13, 1.15, 504, 534, 358/406, 300; 399/329, 8, 9, 15, 33, 67, 399/69, 72, 81, 328, 335, 341; 382/103, 382/108, 112; 430/45.53
See application file for complete search history.

(56) References Cited

U.S. PATENT DOCUMENTS

| | | | | |
|---|---|---|---|---|
| 5,162,860 | A * | 11/1992 | Nami et al. | 358/501 |
| 5,552,890 | A * | 9/1996 | Nanna et al. | 356/369 |
| 5,572,290 | A * | 11/1996 | Ueno et al. | 399/329 |
| 5,852,462 | A * | 12/1998 | Lloyd et al. | 347/156 |
| 6,088,546 | A * | 7/2000 | Inoue et al. | 399/45 |
| 6,397,020 | B1 * | 5/2002 | Kim | 399/45 |
| 7,054,021 | B2 * | 5/2006 | Sesek et al. | 358/1.15 |
| 2003/0099007 | A1 * | 5/2003 | Towner et al. | 358/520 |
| 2005/0259848 | A1 * | 11/2005 | Garoutte | 382/103 |

FOREIGN PATENT DOCUMENTS

| | | |
|---|---|---|
| JP | 08-050429 | 2/1996 |
| JP | 2003-39786 | 2/2003 |
| JP | 2003-140415 | 5/2003 |
| JP | 2003150003 A * | 5/2003 |

OTHER PUBLICATIONS

Office Action from Japanese Patent Office mailed Jul. 25, 2008, 4 pages.
English Translation of the Office Action from Japanese Patent Office mailed Jul. 25, 2008, 7 pages.

* cited by examiner

*Primary Examiner*—Scott A Rogers
(74) *Attorney, Agent, or Firm*—Finnegan, Henderson, Farabow, Garrett & Dunner, L.L.P.

(57) ABSTRACT

A gloss difference control method includes: forming a predetermined image on a sheet in each of a plurality of image forming apparatuses connected to a network; measuring a glossiness of the image formed on each sheet; and controlling a gloss difference among the plurality of image forming apparatuses by changing a gloss adjustment parameter of each of the plurality of image forming apparatuses, based on a plurality of the measured glossiness.

16 Claims, 8 Drawing Sheets

GLOSS DIFFERENCE CONTROL IN A PLURALITY OF NETWORKED IMAGE FORMING APPARATUS

BACKGROUND OF THE INVENTION

1. Field of the Invention

The present invention relates to an image forming apparatus with a heat fixing device for electrophotography process, such as a copier, a printer, a facsimile and the like. More specially, the present invention relates to an image forming apparatus with a gloss control function and gloss control method for an image forming apparatus.

2. Description of Related Art

These days, a system structure in which a plurality of image forming apparatuses are connected to a network for making a productivity thereof as number of times as that of a case of using an image forming apparatus in standalone mode is implemented. This system structure provides a better outputting speed and contributes to productivity. However, when a color image forming apparatus is used, fixing properties are influenced by a fluctuation of components accuracy due to a wear of the components, temperature control accuracy and the like, and thereby there is a possibility of having a deficiency that is a gloss difference in an output image among each image forming apparatus.

Even in a case of singularly using an image forming apparatus, when image formations are continuously performed, while a temperature controlling unit controls the image forming apparatus to return to an initial temperature, there is a time delay for a heat to reach a fixing roller surface from a heat source. In particular, in a case of using an image forming apparatus having large number of copying pages per unit time, there is a large tendency of decreasing a temperature due to an insufficient heat supply. As a result, fixing properties between an output image at an initial stage where a temperature decrease does not occur, and an output image at a point where a temperature decrease occurs are different, whereby a gloss difference is generated.

Further, in addition to a preset temperature, according to a fluctuation of adding pressure by a heating roller and by a pressure roller, a fluctuation of a hardness of the heating roller, an error of a rotation speed of both the rollers and the like, an error in fixing properties may be generated for each image forming apparatus to be used, whereby there is a case of generating a gloss difference in an output image.

These deficiencies occur due to the fact that a toner for forming a color image has a large physical dependence on a heat and a pressure, compared to a toner for forming a monochrome image.

As an art corresponding to an object in the system, in which a plurality of image forming apparatuses are connected to a network, for example, JP-Tokukai-2003-39786A and JP-Tokukai-2003-140415A are known. In these conventional arts, a control of merging a glossiness of a specific image forming apparatus with a glossiness of another image forming apparatus is performed. However, since it is necessary to designate a specific image forming apparatus, an operation becomes more complicated and a flexibility of a gloss adjustment is decreased.

SUMMARY OF THE INVENTION

An object of the present invention is to provide a new method of controlling a gloss difference among a plurality of image forming apparatuses connected to a network, and to provide an image forming apparatus which is connectable to such a network.

In order to achieve the above-mentioned object, in accordance with a first aspect of the present invention, a method for controlling gloss difference in a plurality of image forming apparatus connected to a network, said method comprises steps of: forming a predetermined image on a sheet in each of the plurality of image forming apparatuses; measuring a glossiness of the image formed on each sheet; and controlling gloss difference among the plurality of image forming apparatuses by changing a gloss adjustment parameter of each of the plurality of image forming apparatuses, based on a plurality of the measured glossiness.

Further, in accordance with a second aspect of the present invention, an image forming apparatus which is connectable to a network to which a plurality of image forming apparatuses are connected, the image forming apparatus comprises: an image forming unit which forms a predetermined image on a sheet; a measuring unit for measuring a glossiness of the image formed on the sheet; a transmitting unit for transmitting an information of the glossiness measured by the measuring unit to an external apparatus; a receiving unit for receiving an information regarding a gloss adjustment from an external apparatus; and a control unit for changing a gloss adjustment parameter based on the information regarding the gloss adjustment received by the receiving unit.

Further, in accordance with a third aspect of the present invention, an image forming apparatus which is connectable to a network to which a plurality of image forming apparatuses are connected, the image forming apparatus comprises: a fixing device for fixing the image on the sheet by heating a sheet on which an image is formed; and a control unit comprising a first mode for adjusting a gloss difference of the image thereof from an image of another one of the plurality of image forming apparatuses connected to the network, and a second mode for not adjusting the gloss difference, wherein the control unit changes an operation condition of the fixing device according to a set mode.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein.

PREFERRED EMBODIMENTS OF THE INVENTION

Hereinafter, an embodiment relating to a glossiness adjusting method and an image forming apparatus in the present invention will be described with reference to the drawings.

First, a image forming apparatus relating to the embodiment will be described.

In descriptions of the embodiment, a technical scope of the present invention is not limited by terms used in the specification.

Figure 1:
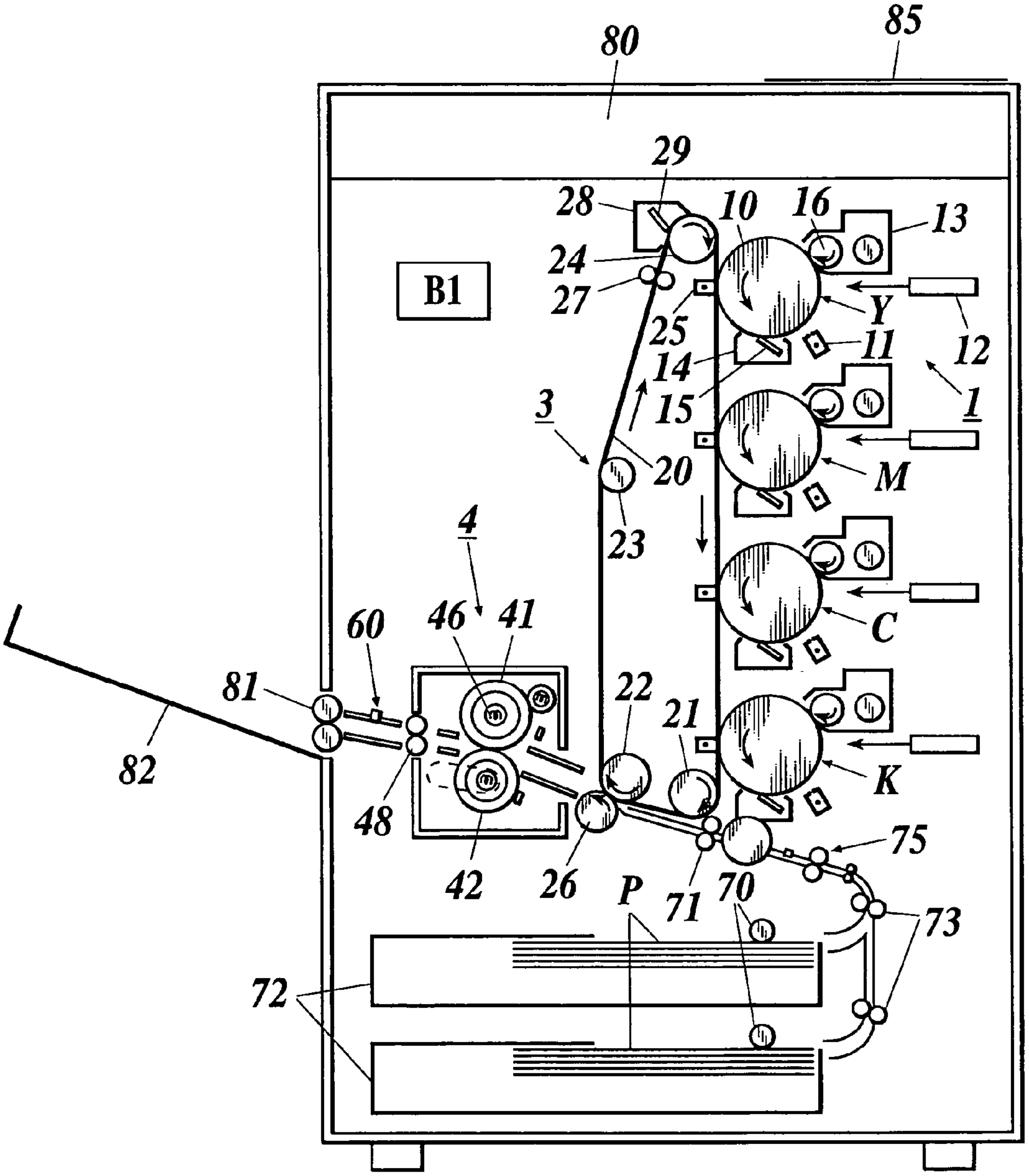
FIG. 1 is a pattern diagram showing one example of a whole structure of an image forming apparatus.

FIG. 1 is a pattern diagram showing one example of a whole structure of the image forming apparatus.

In FIG. 1, a photoreceptor 10; a scorotron electrifier 11, a writing device 12, a development device 13, a cleaning device 14 for cleaning a surface of the photoreceptor 10, a cleaning blade 15; a development sleeve 16, and an intermediate transfer belt 20 are shown. The image forming unit 1 comprises the photoreceptor 10, the scorotron electrifier 11, the development device 13, the cleaning device 14 and the like. Since a mechanical structure of the image forming unit 1 of each color is the same among all the colors, in FIG. 1, reference numbers are shown to a structure of only Y (yellow) system, and reference numbers relating to components of M (magenta), C (cyan) and K (black) are omitted.

An arrangement of the image forming units 1 of each color is made in the order of Y, M, C and K with respect to a running direction of the intermediate transfer belt 20. Each photoreceptor 10 is contacted with a suspended plane of the intermediate transfer belt 20, and each photoreceptor 10 rotates at the contacting point in the same direction as the running direction of the intermediate transfer belt 20 and by the same linear speed as the intermediate transfer belt 20.

The intermediate transfer belt 20 is suspended on a driving roller 21, an earth roller 22, a tension roller 23, an electricity removing roller 27 and a following roller 24. A belt unit 3 is structured by these rollers, and the intermediate transfer belt 20, a transfer device 25, the cleaning device 28 and the like.

A running of the intermediate transfer belt 20 is performed according to a rotation of the driving roller 21 by a driving motor (not shown).

The photoreceptor 10 is made by forming a photosensitive layer such as a conductive layer, an a-Si layer, an organic photoreceptor (OPC) or the like on a circumference of a metal base having a cylindrical shape made of, for example, an aluminum material, and rotates in a counterclockwise direction shown as an arrow in FIG. 1 in a state of having the conductive layer grounded.

An electrical signal corresponding to the image data from a reading apparatus 80 is converted into a light signal by an image formation laser, and is cast on the photoreceptor 10 by the writing device 12.

The development device 13 comprises the development sleeve 16 that is formed in a cylindrical shape from nonmagnetic stainless or aluminum material and rotates in the same direction as the rotating direction of the photoreceptor 10 at the closest position to the photoreceptor 10, and the sleeve 16 keeps a predetermined interval from a circumferential surface of the photoreceptor 10.

The intermediate transfer belt 20 has a volume resistivity of $10^6$ to $10^{12}$Ω·cm. For example, the intermediate transfer belt 20 is a semiconductive seamless belt having a thickness of 0.04 to 0.10 mm in which a conductive material is dispersed into engineering plastic such as denatured polyimide, thermosetting polyimide, ethylene-tetrafluoroethylene copolymer, polyvinylidene difluoride, nylon alloy and the like.

Reference numeral 25 denotes a transfer device. To the transfer device 25, a direct current having a polarity opposite to that of a toner is applied, and the transfer device 25 has a function to transfer a toner image formed on the photoreceptor 10 to the intermediate transfer belt 20. As the transfer device 25, it is possible to use a transfer roller other than a corona discharge device.

Reference numeral 26 denote a transfer roller which can be connected/disconnected to/from an earth roller 22, and the transfer roller 26 re-transfers the toner image formed on the intermediate transfer belt 20 to a transfer material P.

Reference numeral 28 denotes a cleaning device, and the cleaning device 28 is so placed as to face a following roller 24 with respect to the intermediate transfer belt 20. After the toner image is transferred to the transfer material P, an antistatic roller 27 to which an alternating voltage to which a direct current having the same or opposite polarity of the toner is superimposed is applied, weakens an electric charge of a remaining toner of the intermediate transfer belt 20, and a cleaning blade 29 cleans up the remaining toner on the circumferential surface. Reference numeral 4 denotes a fixing device, and reference numeral 60 denotes a glossiness detecting unit for detecting a glossiness of the toner image. Details of the fixing device 4 and the glossiness detecting unit 60 will be described later.

Reference numeral 70 denotes a paper feeding roller, reference numeral 71 denotes a timing roller, reference numeral 72 denotes a paper cassette, and reference numeral 73 denotes a conveyance roller. Further, reference numeral 81 denotes an outputting roller and reference numeral 82 denotes an outputting tray. Reference numeral 85 denotes an operating panel. Reference numeral B1 denotes a control unit which is a control unit.

Figure 2:
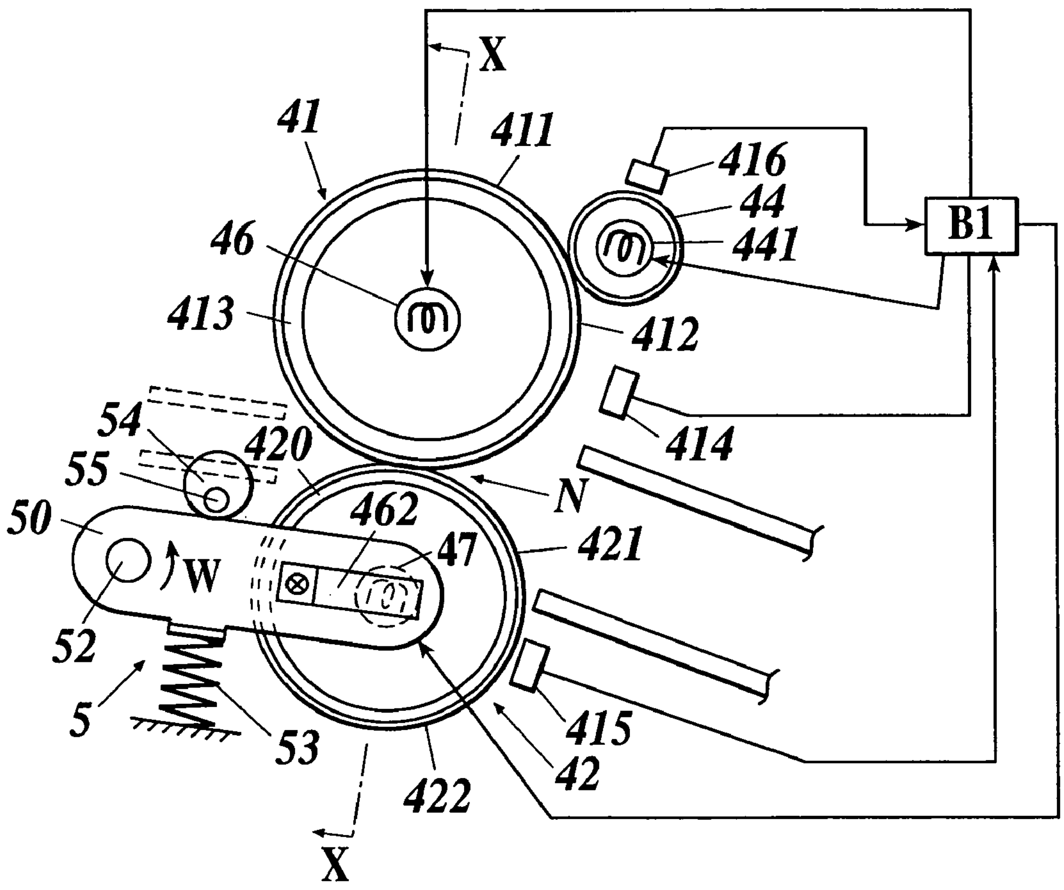
FIG. 2 is a magnified view of a fixing device unit of FIG. 1.

FIG. 2 is a magnified view of the fixing device of FIG. 1.

Figure 3:
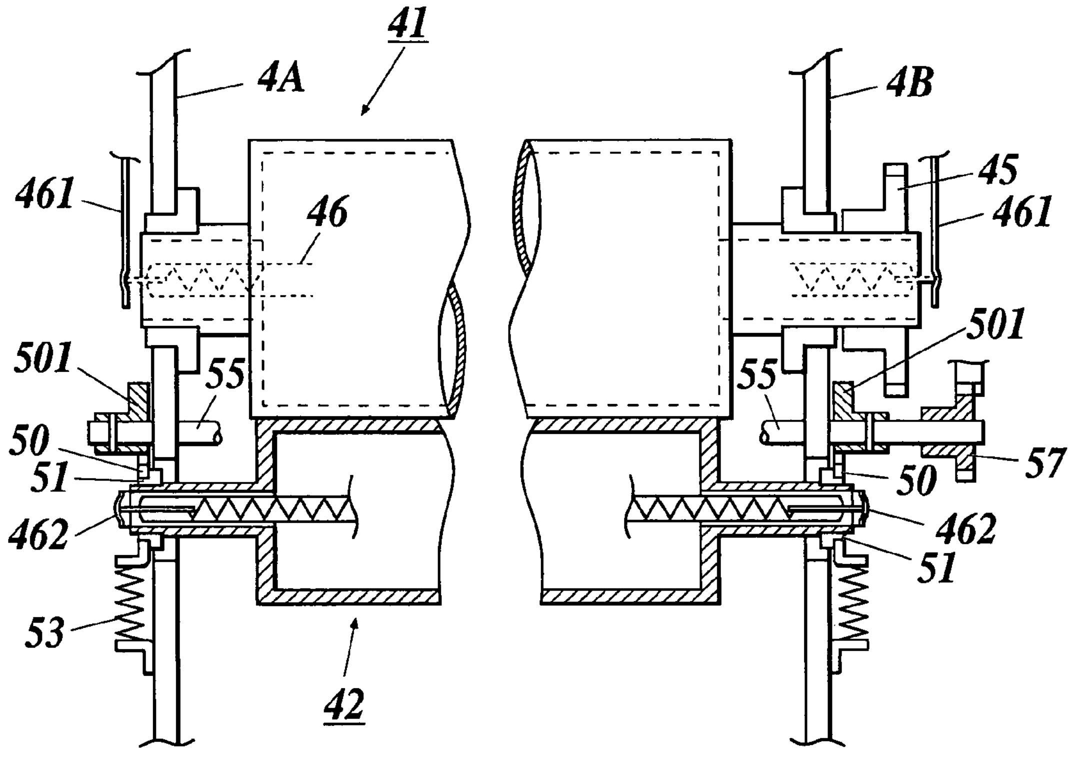
FIG. 3 is a sectional view taken along an arrow X-X in FIG. 2.

FIG. 3 is a sectional view taken along an arrow X-X in FIG. 2.

In FIG. 2 and FIG. 3, reference numeral 41 denotes a heating roller. The heating roller 41 is structured by applying a lining of a heat resisting elastic layer 412 which is an elastic member to a cored bar 413 formed from aluminum having a cylindrical shape, and by coating a mold release layer 411 over a periphery of the heat resisting elastic layer 412. The heating roller 41 rotates by obtaining a force from a driving unit (not shown) through a gear 45. A halogen heater 47 which is a heat source heats the heating roller 41 and arranged in a cavity through a supporting contact 461 heats the heating roller 41 up to a predetermined temperature, and the temperature thereof is detected by a noncontact thermal sensor 414 placed in the vicinity of a surface of the heating roller 41 to be transmitted to a control unit B1. Then, the control unit B1 turns the halogen heater 46 ON/OFF, for controlling a surface temperature of the heating roller 41 to be the predetermined temperature.

A pressure roller 42 is structured by forming a heat resisting elastic layer 422 made of silicon rubber on a surface of a cored bar 420 made of aluminum having a cylindrical shape, and by applying a coating layer 421 made of fluororesin on further outside. The pressure roller 42 is heated up to a predetermined temperature by a halogen heater 47 arranged in a cavity thereof through a supporting contact 462, and the temperature is detected by a noncontact thermal sensor 415 placed in a vicinity of the surface of the pressure roller 42 to be transmitted to the control unit B1. Then, the control unit B1 turns the halogen heater 47 ON/OFF, for controlling a surface temperature of the pressure roller 42 to be the predetermined temperature.

Reference numeral 44 denotes an exterior heating roller for subsidiarily adding a heat to the pressure roller 41 and for covering the heat source. In the case of using a color image forming apparatus, since the heat resisting elastic layer is provided with a fixing rotation member which is contacted with a toner which has not yet been fixed for securing an image quality, a thermal conductivity to a surface in a case of heating from the inside of the fixing rotation member is bad, and therefore a surface temperature change according to an abrupt temperature increase or an abrupt temperature decrease becomes more than that of a case of using a monochrome image forming apparatus using a fixing rotation member which does not comprise a heat resisting elastic layer. Accordingly, in order to improve the thermal conductivity that is bad when the heating is done from the inside of the fixing rotation member, the temperature change is improved externally by the exterior heating roller 44 or the like. In the present embodiment, the exterior heating roller 44 structured by applying a coating of a mold release layer made of fluororesin to a cored bar made of aluminum having a cylindrical shape is used, and a halogen heater 441 is placed in a cavity part. A surface temperature of the exterior heating roller 44 is detected by a thermal sensor 416 to be transmitted to the control unit B1. Then, the control unit B1 controls the halogen heater 441 to be turned ON/OFF based on information of the thermal sensor 416 and information of the noncontact thermal sensor 414.

The heating roller 41 and the pressure roller 42 are always under a state of being pressured by a pressure mechanism 5, and its pressure is adjusted by a eccentric cam 54.

The pressure mechanism 5 comprises a roller supporting plate 50 for supporting the pressure roller 42 at both the edges through a bearing 51, a pressure spring 53 for pushing the roller supporting plate 50 in a direction of an arrow W with a rotation axis 52 used as its bearing, the eccentric cam 54 engaged with the roller supporting plate 50 for setting a pressure at a nip N, a rotation axis 55 for locking the eccentric cam 54 in the same phase, and the like. Here, the rotation axis 55 is supported by a fixing device frames 4A and 4B through a bearing (not shown).

According to an instruction from the control unit B1, the eccentric cam 54 obtains a force from a driving unit (not shown) and rotates from a predetermined reference position as much as a predetermined angle, whereby it is possible to increase/decrease a pressure amount (nip width) to the heating roller that is a heating member to the pressure roller 42.

When a fixing process to a transfer material P is completed in the fixing device 4, the transfer material P is conveyed by a fixing output roller 48 (see FIG. 1). Further, a glossiness detecting unit 60 placed in a vicinity of a downstream of the fixing output roller 48, which is a measuring unit of a glossiness, detects a glossiness of the transfer material P.

Figure 4:
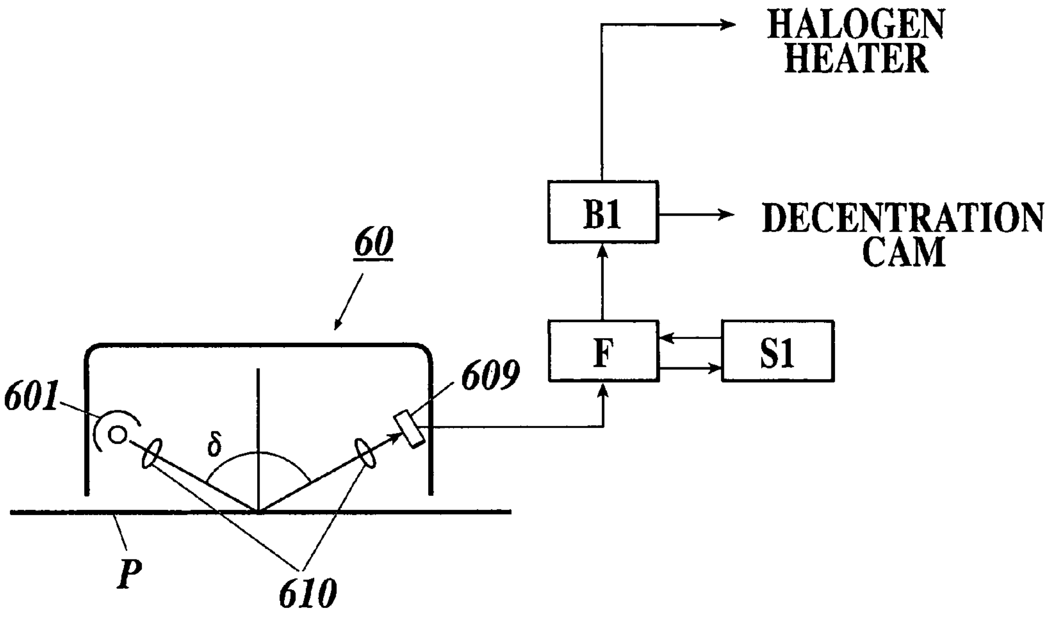
FIG. 4 is a rough structure view showing a glossiness detecting unit in the present embodiment.

FIG. 4 is a rough structure view of the glossiness detecting unit in the present embodiment. In FIG. 4, the beam emitted from a light source 601 passes through a lens 610 and enters the transfer material P by an angle δ. Then, the beam reflected in the direct reflection direction is detected by the photodetector 609 through the lens 610. By arranging the glossiness detecting unit 60 between the fixing device 4 and the output tray 82 of FIG. 1, it is possible to detect a surface glossiness of an outputted toner image. A detected electric signal (glossiness information) is transmitted to a server S1 (see FIG. 5) through a communication unit F which has a transmitting function and a receiving function. In response to the transmitted electric signal, an information regarding a gloss adjustment for automatically adjusting at least one of temperatures of the two rotation members, contact pressure of the two rotation members and nip width is transmitted to the communication unit F.

Figure 5:
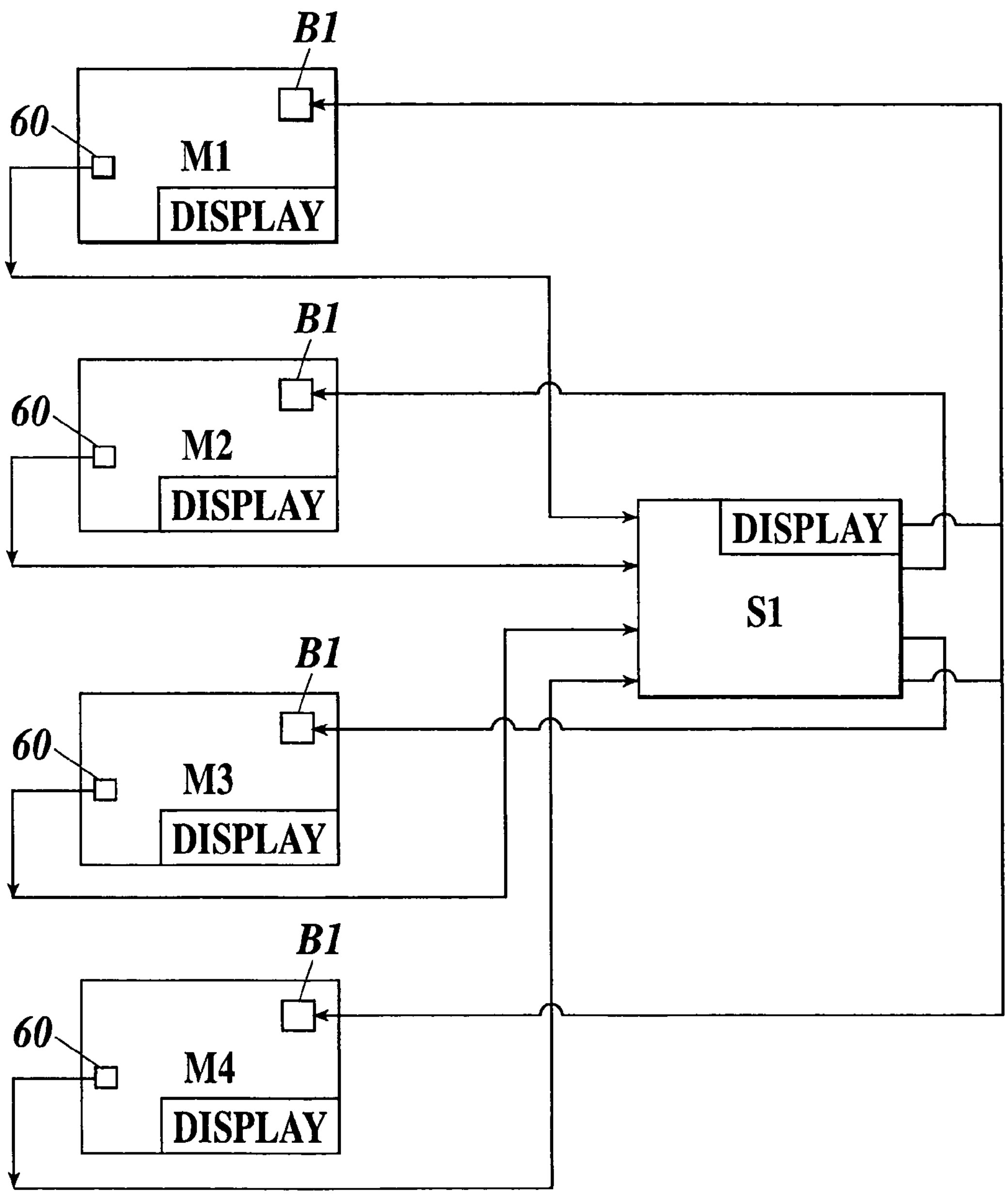
FIG. 5 is a block diagram showing a system structure in which four image forming apparatuses each of which comprises a heat fixing device are joined and controlled by a central controlling unit.

FIG. 5 is a block diagram showing a system structure in which a central control unit controls four image forming apparatuses connected to each other each of which comprises a thermal fixing device.

In FIG. 5, the glossiness of the toner image on the transfer material outputted from the fixing apparatus 4 (see FIG. 1) is detected by the glossiness detecting unit 60, and the detected glossiness is transmitted to the server S1 on the network through the communication unit F, which is not shown in FIG. 5. In the server S1, programs regarding a relation between a representative glossiness and a temperature of the rotation member, a relation between a glossiness, contact pressure of the two rotation members and nip width or the like are stored, and the server S1 transmits the information regarding a gloss adjustment for automatically changing at least one of the temperature of the two rotation members, the contact pressure of the two rotation members and the nip width as a gloss adjustment parameter based on the program, to each of the image forming apparatuses M1 to M4.

In other words, in the case that the image forming apparatuses M1 to M4 are used in a tandem fashion, when an adjustment mode start button for entering a gloss adjustment mode is pushed, in the image forming apparatuses M1 to M4, a paper is fed from a paper cassette selected by a user, and an identical test image pattern (image forming apparatus stores the image data) is formed on the paper and outputted after the fixing.

When the paper is outputted in each of the image forming apparatuses M1 to M4, the glossiness detecting unit 60 of each image forming apparatus detects the test image pattern. Values of the detected glossiness are set as K(M1), K(M2), K(M3) and K(M4).

Figure 6A:
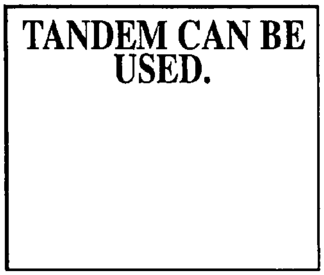
FIGS. 6A to 6F are views showing messages displayed on a display unit of an operation panel.
Figure 6B:

When a difference of the four K values (difference between the maximum value and the minimum value of the glossiness) is not more than a predetermined value, while fixing conditions of the four image forming apparatuses remain unchanged, information indicating that they can be used as an image forming system in a tandem fashion is displayed on a display of the server S1 as shown in FIG. 6A. Conversely, when the difference of the four K values is more than the predetermined value, the four image forming apparatuses enters an operation for adjusting the fixing conditions, and information indicating that an adjustment is being performed is displayed on the display of the server S1 as shown in FIG. 6B.

FIGS. 6A to 6F are messages shown on the display of the server S1.

In general, gloss increase when a temperature of the heating member is higher, when the pressure amount of the two rotation members is higher, and when the nip width is longer.

Next, an example of the control will be described.

For example, when the detected glossiness values satisfy: K(M3)>K(M1)>K(M4)>K(M2), the gloss of the four image forming apparatuses are controlled to be as close to each other as possible according to the following method a) or b).

a) Decrease fixing temperatures of the image forming apparatuses M1 and M3. When amount of decreasing the fixing temperature is defined as ΔT, a condition of ΔT(M3)>ΔT(ML) has to be satisfied. Increase fixing temperatures of the image forming apparatuses M2 and M4. When amount of increasing the fixing temperature is defined as ΔT, a condition of ΔT(M2)>ΔT(M4) has to be satisfied. b) Decrease contact pressures of the image forming apparatuses M1 and M3.

When amount of decreasing the fixing pressure is defined as Δp, a condition of Δp(M3)>Δp(M1) has to be satisfied. Increase contact pressures of the image forming apparatuses M2 and M4. When amount of increasing the fixing pressure is defined as Δp, a condition of Δp(M2)>Δp(M4) has to be satisfied.

In addition to the above-mentioned a) and b), a control method in combination with both a temperature and a pressure may be also used.

By the above-mentioned method, the adjustment is repeated until the difference of the glossiness K of the test image pattern among the four image forming apparatuses becomes not more than a predetermined value.

Figure 6C:
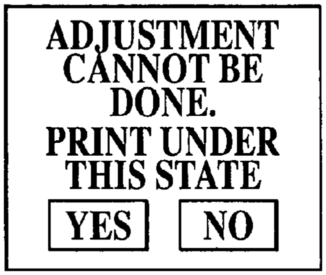

However, even when the fixing temperature and/or the contact pressure is changed, there is a case in which the difference of the glossiness K does not become not more than the predetermined value and it is judged that it is not possible to perform any more adjustment on the fixing temperature and the contact pressure due to limitations of the image forming apparatus. In such a case, an error message indicating that the adjustment cannot be done as shown in FIG. 6C is displayed on the display of the server S1. Here, when YES is selected, the gloss difference among the image forming apparatuses is regarded as permissible, and a state in which a print can be performed is provided. When NO is selected, the process is suspended. Further, though detailed descriptions will be made later, when an instruction to make a glossiness of a toner image of one designated image forming apparatus common with the other three image forming apparatuses is made, the other three image forming apparatuses are controlled so as to make a glossiness thereof automatically correspond to that of the toner image of the designated image forming apparatus. Here, displayed information of FIGS. 6A to 6F may also be displayed on each of the image forming apparatuses M1 to M4, other than displayed on the server S1.

When a user pushes the adjustment mode button, a paper is fed from the paper cassette 72 of one of the image forming apparatuses M1 to M4 selected by a user, an identical test image pattern is formed on the paper, and the paper is outputted after the fixing is done.

On the paper, in order to make it possible to distinguish which image forming apparatus has outputted the image, an apparatus number (M1 to M4) is also written.

Figure 6D:
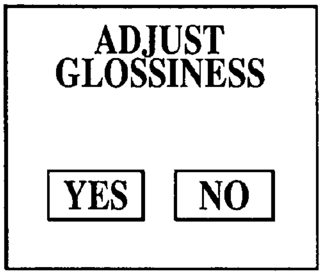
Figure 6E:
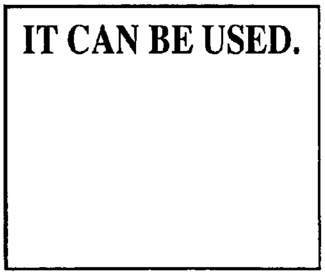
Figure 6F:
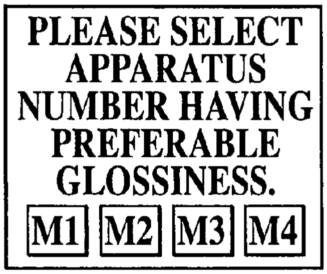

When the paper is outputted, the glossiness detecting unit 60 of each image forming apparatus detects a glossiness of the test image pattern, and an information shown as FIG. 6D is displayed on the display of the server S1. Here, when YES is selected, an information indicating that it is possible to use the system as a tandem system while the fixing conditions of the four image forming apparatuses remain unchanged is displayed as shown in FIG. 6E. Conversely, when NO is selected, a display shown in FIG. 6F is performed.

When a user selects and inputs an apparatus number of an image forming apparatus having a desirable glossiness, a display shown in FIG. 6B is performed on the display of the server S1.

Here, when a condition of K(M3)>K(M1)>K(M4)>K(M2) is detected and the user prefers a glossiness of M1 to be selected and inputted, the following control is performed.

The fixing temperature of the image forming apparatus M3 is decreased, and the fixing temperatures of the image forming apparatuses M2 and M4 are increased. When amount of increasing the fixing temperature is defined as ΔT, a condition of ΔT(M2)>ΔT(M4) has to be satisfied (in addition to this example, a control may be performed on contact pressure, or performed in combination with both a pressure and a temperature). In this way, the above-mentioned gloss adjustment is repeated until a gloss difference that a user prefers is obtained. However, even when the fixing temperature and/or the contact pressure is changed, there is a case in which a glossiness that a user prefers cannot be obtained and it is judged that it is not possible to make any more change on the temperature and the pressure due to limitations of the image forming apparatus or that no improvement can be made by further changes due to the limitations, a display shown in FIG. 6C is appeared. Here, when YES is selected, a gloss difference among the image forming apparatuses is regarded as permissible and a state in which a print can be performed is provided. When NO is selected, a tandem output is not allowed, and the above-mentioned processes are repeated.

In other words, even though an unevenness of a component accuracy and a temperature control accuracy of the fixing device differentiates fixing properties among the image forming apparatuses, whereby a glossiness is different from each other, by giving an instruction to the control unit B1 of each image forming apparatus from the server S1, an instructed glossiness is automatically set.

The detection of a glossiness of an image outputted from each image forming apparatus may be done by using a scanner comprising the glossiness detecting unit 60, the scanner connected to the image forming system. In this case, a user put the paper outputted from each image forming apparatus to a scanner having a feeder. In this way, it is possible to make the system recognize a relation between an apparatus number of each image forming apparatus and a glossiness.

Further, any one of the image forming apparatuses may play the role of the server S1.

Here, “fixing temperature” in the description above indicates a surface temperature of the heating roller and/or the pressure roller.

Figure 7A:
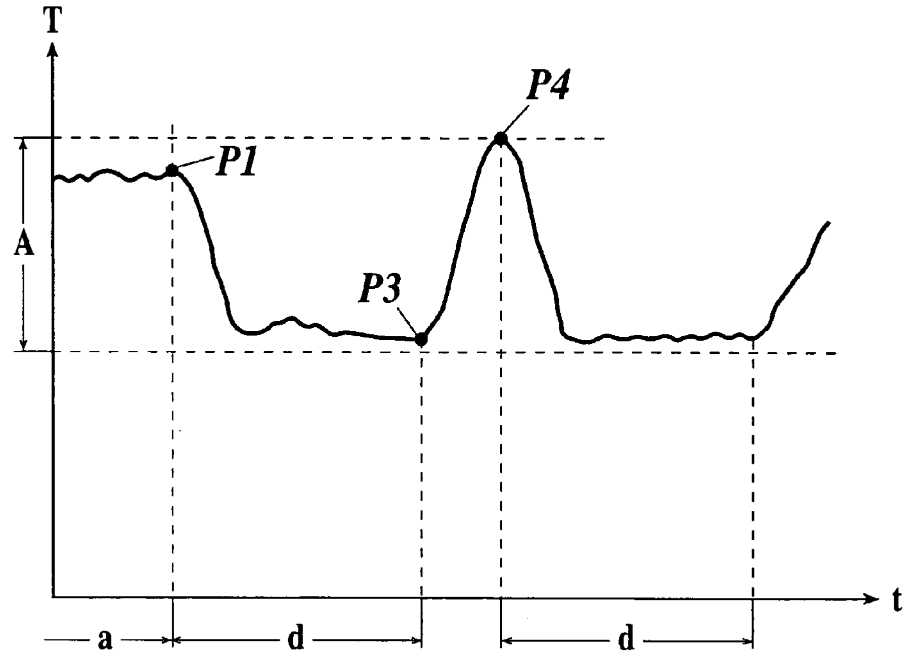
FIGS. 7A and 7B are views showing fixing temperature curves.
Figure 7B:
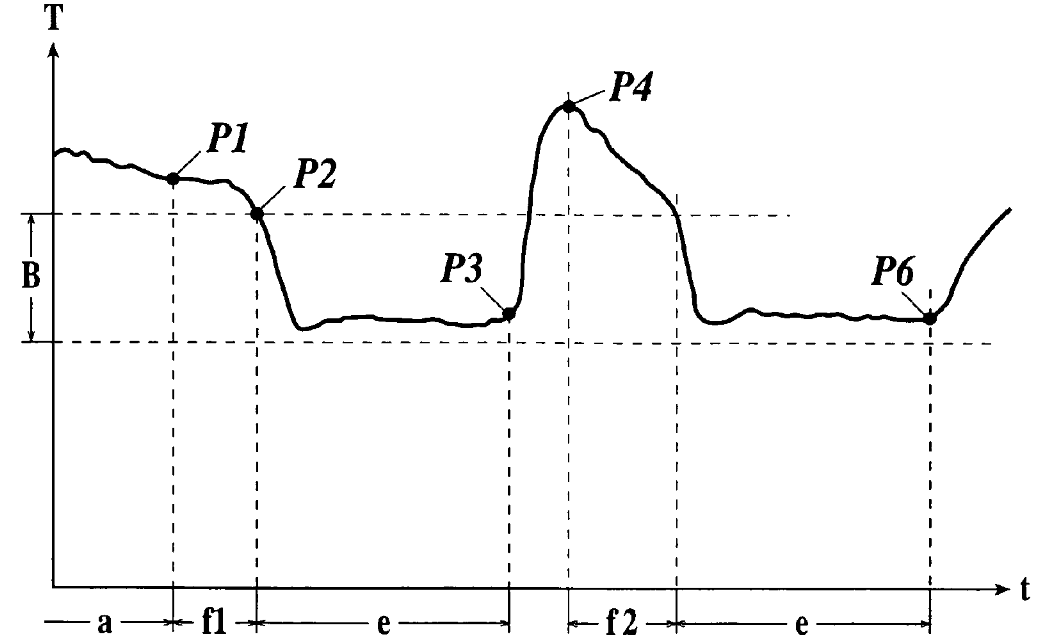

FIGS. 7A and 7B are views showing a temperature curve of a heating material for describing another embodiment.

FIG. 7A shows a fixing temperature change in a first mode under which an image forming apparatus is used in standalone fusion, and FIG. 7B shows a fixing temperature change in a second mode under which image forming apparatuses are used in a tandem fashion. In FIGS. 7A and 7B, ‘T’ indicates a fixing temperature, ‘t’ indicates a time, ‘a’ indicates a standby (idling), ‘d’ indicates an image formation period in the first mode, ‘e’ indicates an image formation period in the second mode, and ‘f1’ and ‘f2’ indicates waiting periods.

In FIG. 7A, while the image forming apparatus is operated in the first mode, when an image formation instruction is received at a point P1 under a standby (idling) state, the heating roller 41 and the pressure roller 42 perform pressing and rotating. During this process, heat of the heating roller 41 is being taken by the pressure roller 42 having a lower temperature, and an image formation is started and thereby a paper whose conveyance is started also takes heat from the heating roller 41. Therefore, a temperature of the heating roller 41 decreases. However, after a while, the temperature decrease is stopped, and the temperature either becomes steady or increases. When a series of image formation are completed at a point P3, the pressing and rotating of the heating roller 41 and the pressure roller 41 are stopped, and the surface temperature of the heating roller 41 abruptly increases according to an overshoot phenomenon. Next, when a next image formation instruction is received at a point P4 at which the surface temperature is increasing, the pressing and rotating of the heating roller 41 and the pressure roller 42 is stopped, and the same operation as above is repeated. In this way, even in the first mode, since a temperature change of the heating roller 41 occurs, an image gloss is changed. In other words, even in the first mode, a gloss unevenness occurs at a certain degree.

Even though a gloss unevenness is within the permissible range in the first mode, when these image forming apparatuses are used as a system in the second mode, a gloss difference among each image forming apparatus is also generated in addition to each gloss unevenness, and therefore it is not possible to have a permissible gloss unevenness as a whole. In the following embodiment, a method to improve such a situation will be described.

In this embodiment, the image forming apparatuses provided in a tandem fashion are controlled so as to differentiate a condition for starting the fixing operation between the first mode and the second mode, whereby a gloss difference among the image forming apparatuses is minimized.

Hereinafter, a fixing temperature control will be described.

In FIG. 7B, at a point P1 in a standby (idling) state, when an image formation instruction is received, the heating roller 41 and the pressure roller 42 perform the pressing and the rotating and a heat of the heating roller 41 is taken by the pressure roller 42 having a lower temperature than the heating roller, without the image formation performed. Then, after a waiting period f1 has passed since the instruction, the control is performed so that a temperature of the heating roller 41 decreases to a point P2 at which the temperature reaches a range B, which is the permissible temperature range of an image forming system in a tandem fashion, and then the image formation is started and a paper feeding is also started. At a point P3, when a series of image formations are completed, the pressing and the rotating of the heating roller 41 and the pressure roller 42 are suspended, and the surface temperature of the heating roller 41 abruptly increases according to an overshoot phenomenon. Next, at a point P4 where the surface temperature is increasing, when a next image formation instruction is received, the heating roller 41 and the pressure roller 42 perform the pressing and the rotating, and the heat of the heating roller 41 is taken by the pressure roller 42 having a lower temperature than the heating roller 41. At this time, the image formation is not performed either, and the control is performed so that after a waiting period f2 has passed since the instruction, the temperature of the heating roller 41 decreases to the range B which is the permissible temperature range, and then the image formation is started and the paper feeding is also started. In this way, by suppressing a glossiness unevenness of one image forming apparatus, it is possible to suppress glossiness unevenness of the four image forming apparatuses in a tandem fashion.

In other words, when a detected temperature of a heating member in the first mode is within a range A, in the second mode, by starting the fixing and the paper feeding when the temperature is within the range A and reaches the range B, which is narrower than the range A, it is possible to minimize a gloss difference among each image forming apparatus.

Within the above-mentioned waiting periods f1 and f2, the halogen heater 46 may be turned ON or OFF. The heating roller 41 and the pressure roller 42 may perform the pressing or may release the pressing. Preferably, the heating roller 41 and the pressure roller 42 perform the pressing and the rotating for immediately decreasing the temperature of the heating roller 42.

Incidentally, in the present embodiment, the range A is set between 160° C. and 190° C. and the range B is set between 160° C. and 175° C.

As above, the descriptions of the embodiment as shown in FIG. 2 have been made.

Figure 8:
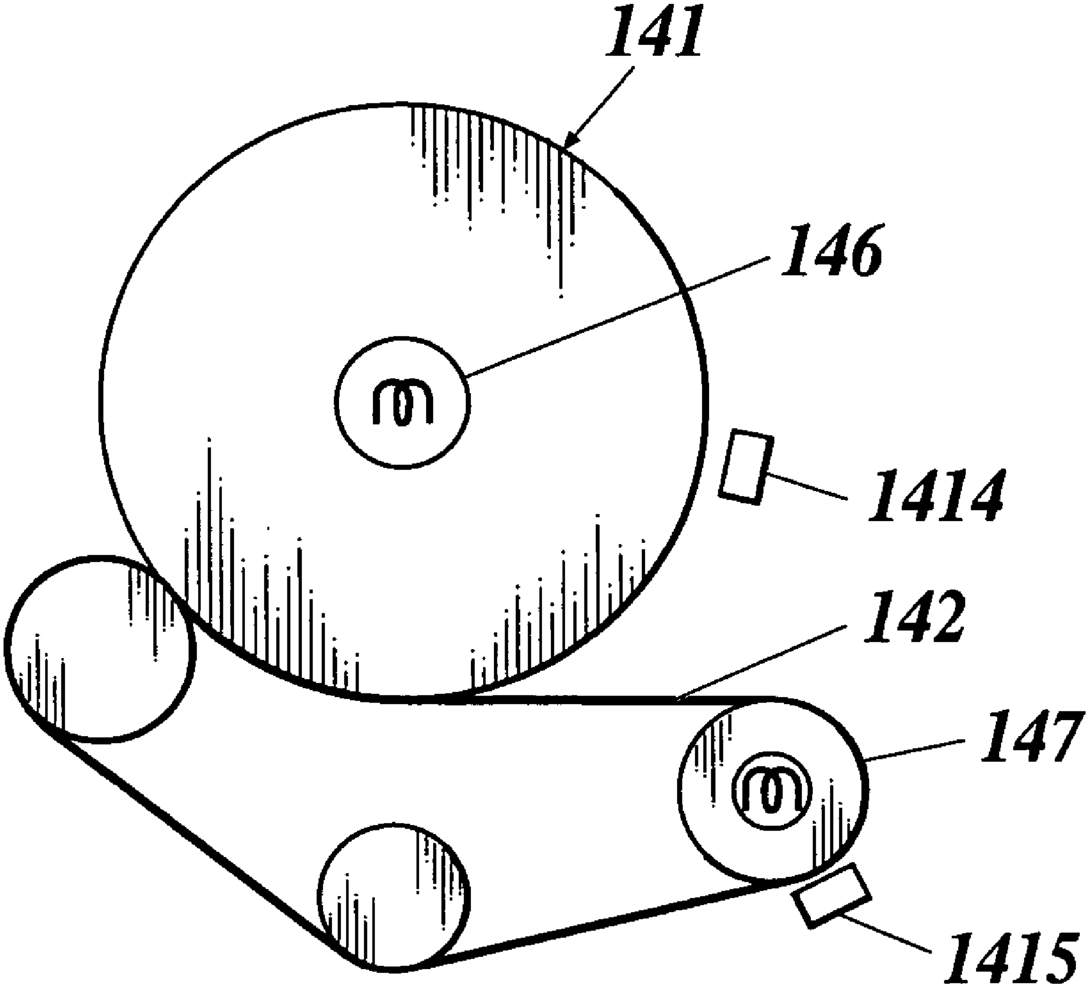
FIG. 8 is a view showing another embodiment.

FIG. 8 shows another embodiment. Reference numeral 141 denotes a heating roller, reference numeral 142 denotes a pressure belt, reference numeral 146 denotes a halogen heater, reference numeral 147 denotes a subsidiary heater, and reference numerals 1414 and 1415 denote noncontact thermal sensors.

FIG. 8 shows a method in which, by using the heating roller 141 and the pressure belt 142, and by making the noncontact thermal sensor detect a temperature of the heating roller 141 which is a heating member, a temperature control is performed in the above-mentioned way.

The entire disclosure of a Japanese Patent Application No. Tokugan 2004-229139 filed on Aug. 5, 2004, including specifications, claims, drawings and summaries are incorporated herein by reference in their entirety.

What is claimed is:

1. A method for controlling gloss difference in a plurality of image forming apparatuses connected to a network, said method comprising steps of:

forming a predetermined image on a sheet in each of the plurality of image forming apparatuses;

measuring a glossiness of the image formed on each sheet;

receiving information indicating one of the plurality of image forming apparatuses displayed on an operating unit, selected according to a manual inputting operation based on the glossiness of the image formed on each sheet; and controlling gloss difference among the plurality of image forming apparatuses by changing a gloss adjustment parameter of each of the other image forming apparatuses, based on the measured glossiness relating to the selected image forming apparatus.

2. The method of claim 1, wherein the gloss adjustment parameter includes at least one of a temperature of a fixing device of image forming apparatuses, a contact pressure of two members in the fixing device and a nip width of the two members.

3. The method of claim 1, wherein in the measuring step, the glossiness is measured by each of the plurality of image forming apparatuses.

4. The method of claim 1, wherein in the controlling step, the gloss adjustment parameter of each of the plurality of image forming apparatuses is changed so as to make the gloss difference among the image forming apparatuses not more than a predetermined value.

5. The method of claim 4, wherein in the forming step, the measuring step and the controlling step are repeated a plurality of times until the gloss difference among the image forming apparatuses becomes not more than the predetermined value.

6. The method of claim 4, wherein an error message indicating that it is not possible to adjust gloss is displayed on a display unit, when it is judged in the controlling step, that changing the gloss adjustment parameter cannot make the gloss difference among the image forming apparatuses become not more than the predetermined value.

7. The method of claim 6, wherein the image formation with the gloss difference of more than the predetermined value is permitted to perform, after the error message is displayed.

8. The method of claim 5, wherein the controlling the gloss difference comprises changing the gloss adjustment parameter as much as a predetermined amount every controlling step.

9. An image forming system including an image forming apparatus which is connectable to a network to which a plurality of image forming apparatuses are connected, the image forming system comprising:

the image forming apparatus including:

an image forming unit for forming a predetermined image on a sheet;

a measuring unit for measuring a glossiness of the image formed on the sheet;

a transmitting unit for transmitting information of the glossiness measured by the measuring unit to an external apparatus;

a receiving unit for receiving information regarding a gloss adjustment from the external apparatus; and a control unit for changing a gloss adjustment parameter based on the information regarding the gloss adjustment received by the receiving unit, and the external apparatus including:

an operation unit for accepting manual operation for selecting one of the plurality of image forming apparatuses based on the information of the glossiness of the image formed on each sheet, wherein the external apparatus generates the information regarding the gloss adjustment for other image forming apparatuses based on the information of the glossiness of the selected image forming apparatus.

10. The system of claim 9, wherein the image forming apparatus is a copier, and the measuring unit is provided with a scanner unit of the copier.

11. The system of claim 9, wherein the gloss adjustment parameter generated by the control unit includes at least one of a temperature of a fixing device of the image forming apparatus, a contact pressure of two members in the fixing device and a nip width of the two members.

12. The system of claim 9, wherein the transmitting unit transmits the information of the measured glossiness to a server connected to the network, and the receiving unit receives the information regarding the gloss adjustment from the server.

13. The system of claim 9, wherein operations of the image forming unit, the measuring unit, the transmitting unit, the receiving unit and the control unit are repeated until a gloss difference among the plurality of image forming apparatuses becomes not more than a predetermined value.

14. The system of claim 13, wherein the image forming apparatus further comprises a display unit for displaying an error message indicating that it is not possible to adjust gloss on a display unit, when the control unit judges that changing the gloss adjustment parameter cannot make the gloss difference among the plurality of image forming apparatuses become not more than the predetermined value.

15. The system of claim 9, wherein the measuring unit measures the glossiness of the image by emitting a beam to the sheet on which the image is formed and by measuring the beam reflected from the sheet.

16. The system of claim 15, wherein the measuring unit is located at downstream of the fixing device in a transporting direction of the sheet.

* * * * *